Feb. 24, 1948.　　　　J. J. ROHRBACH　　　　2,436,606
SPECTACLE LENS MOUNTING
Filed April 26, 1945　　　　4 Sheets-Sheet 1

INVENTOR
John J. Rohrbach
BY Theodore E. Simonton
ATTORNEY

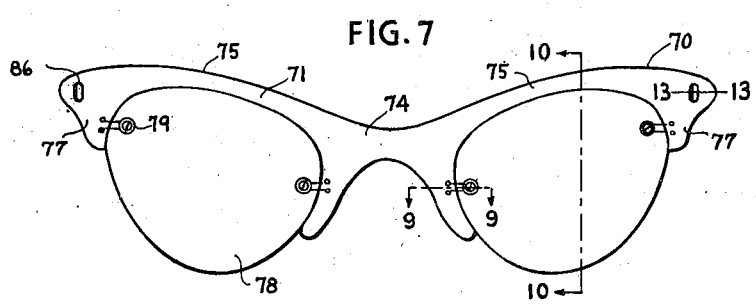
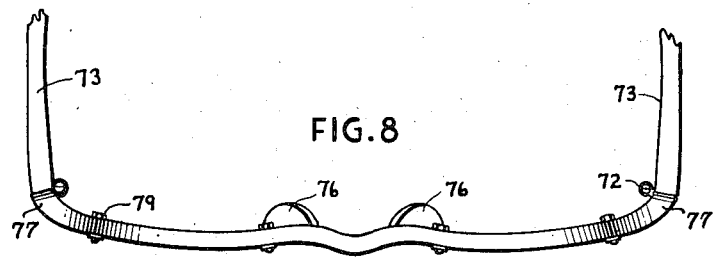
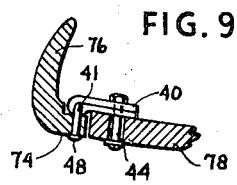
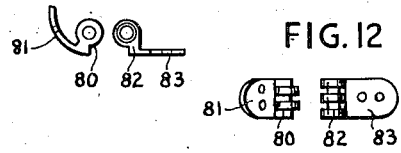
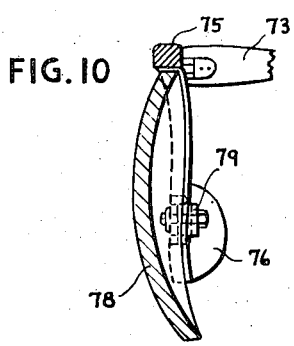
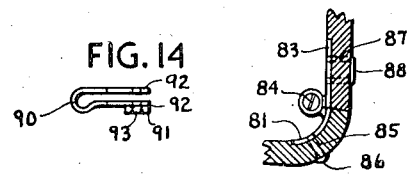
INVENTOR
John J. Rohrbach
BY Theodore E. Simonton
ATTORNEY Feb. 24, 1948. J. J. ROHRBACH 2,436,606
SPECTACLE LENS MOUNTING
Filed April 26, 1945 4 Sheets-Sheet 3

INVENTOR
John J. Rohrbach
BY Theodore E. Simonton
ATTORNEY

Feb. 24, 1948.    J. J. ROHRBACH    2,436,606
SPECTACLE LENS MOUNTING
Filed April 26, 1945    4 Sheets-Sheet 4

INVENTOR
John J. Rohrbach
BY Theodore E. Simonton
ATTORNEY

Patented Feb. 24, 1948

2,436,606

UNITED STATES PATENT OFFICE 2,436,606

SPECTACLE LENS MOUNTING

John J. Rohrbach, Rochester, N. Y., assignor to Shuron Optical Company, Inc., Geneva, N. Y., a corporation of New York Application April 26, 1945, Serial No. 590,468

7 Claims. (Cl. 88—47)

This invention relates to improvements in ophthalmic mountings, and is directed more specifically to top arm spectacles made of zylonite or the like.

This invention constitutes an improvement upon the disclosure of Rochte United States Patent 2,301,328, in that it adapts the pivoted strap lens supporting arrangement of the Rochte patent to zylonite top arm or semi-rimless spectacles.

The principal object of my invention is to provide top arm spectacles made of zylonite or the like and having pivoted strap lens supports incorporated therein in a particularly simple and effective manner.

Other objects and advantages of my invention will become apparent upon reading the following specification in conjunction with the accompanying drawings, in which:

Figure 7 is a front view of a pair of spectacles embodying a modified form of my invention;

Figure 8 is a top plan view thereof;

Figure 9 is a detail view taken on the line 9—9 of Figure 7;

Figure 10 is a vertical section taken on the line 10—10 of Figure 7;

Figure 11 is a top plan exploded view of the two parts of the temple hinge shown in Figure 8;

Figure 12 is a side elevational exploded view of the temple hinge parts of Figure 11;

Figure 13 is a detail view taken on the line 13—13 of Figure 7, showing the temple hinge of Figures 11 and 12 in place in the spectacles;

Figure 14 is a side elevational view of a modified form of pivoted strap;

Figure 1:
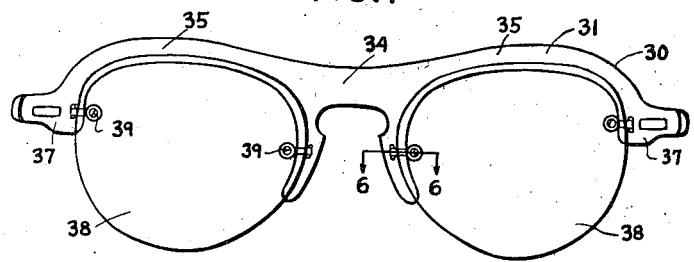
Figure 1 is a front view of a pair of spectacles embodying my invention.
Figure 2:
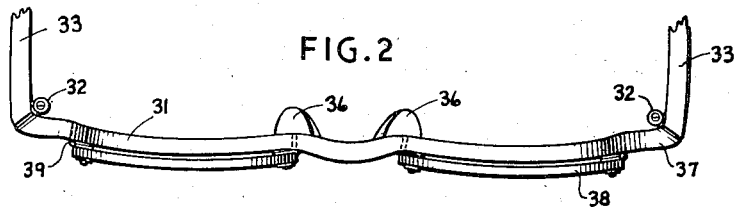
Figure 2 is a top plan view thereof, parts of the temples being broken away.
Figure 3:
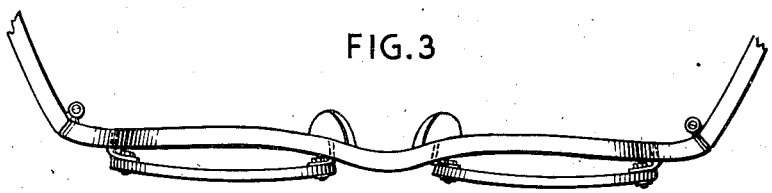
Figure 3 is a top plan view similar to Figure 2, but showing the spectacles in a distorted position such as may be produced in putting them on or removing them from the face.
Figure 4:
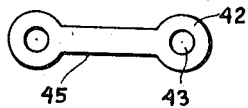
Figure 4 is a plan view on an enlarged scale of a metal blank used in forming a pivoted strap.

Referring first to the modification shown in Figures 1 to 6, inclusive, of the drawings, the spectacles 30 of my invention comprise a spectacle front 31, made of zylonite or like plastic material, connected by hinges 32, which may be of conventional construction, to temples 33. The spectacles 30 are of the general type known as top arm or semi-rimless spectacles. The spectacle front 31 comprises a bridge portion 34, top arm portions 35, nose pads 36 and endpiece portions 37, all preferably formed integrally from the plastic material.

The lenses 38 of the spectacles 30 are shown as located in front of and slightly overlapping the spectacle front 31. Each lens 38 is suspended from the spectacle front 31 at two spaced points by a pair of pivoting lens strap assemblies 39, one of each pair of these assemblies 39 being secured to the bridge portion 34 and the other to an endpiece portion 37 of the front 31.

Figure 5:
Figure 5 is a perspective view of a strap and staple assembly prior to incorporation in the spectacles.
Figure 6:
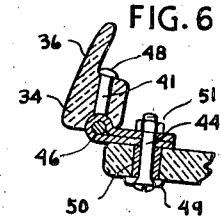
Figure 6 is a detail view taken on the line 6—6 of Figure 1.
Figure 15:
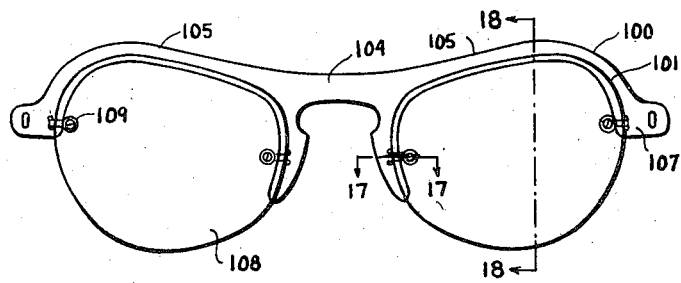
Figure 15 is a front view of a pair of spectacles embodying a still further modification of my invention.
Figure 16:
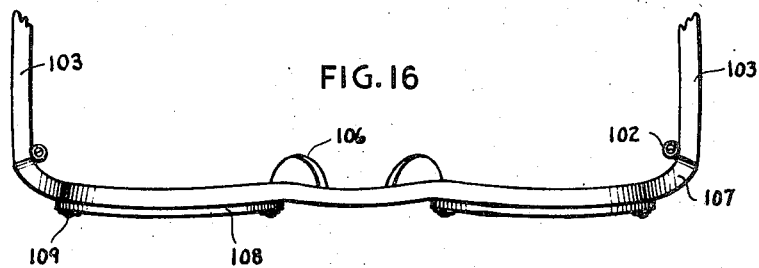
Figure 16 is a top plan view thereof.
Figures 17, 18:
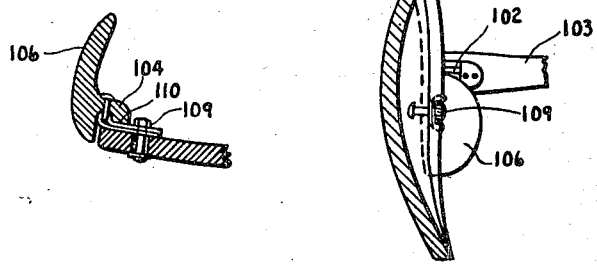
Figure 17 is a detail view taken on the line 17—17 of Figure 15.
Figure 18 is a vertical section taken on the line 18—18 of Figure 15.

As best shown in Figures 5 and 6, each strap assembly 39 comprises a looped metal strap 40 pivoted on the head of a staple 41 and provided with ears 42 having apertures 43 through which projects a lens screw 44. The strap 42 may be formed to the shape shown in Figures 5 and 6 from a flat metal blank 45, shown in Figure 4, which blank may be stamped and punched to the contour illustrated in a single operation. A loop 46 is made in the strap 40 during the forming operation, and the strap is assembled on the staple 41, prior to assembling the staple in the spectacle front, so that this loop is free to pivot about the circular head of the staple. The legs of the staple 41 may be provided with corrugations 47, as shown in Figure 5, to secure the staple more firmly in place in the plastic material of the spectacle front 31. The legs of the staple are inserted in holes in the plastic material of the spectacle front, and may extend entirely through the plastic material, in which case the outer ends of the legs are preferably peened to form smooth heads 48, as shown in Figure 6. Alternatively or additionally, the staples 41 may be secured in place by cementing or by pressing or molding the plastic material of the spectacle front about the legs of the staples.

The lenses 38 are secured to the ears 42 by the lens screws 44 passing through the apertures 43 in the ears and through the conventional screw holes in the lenses. Each lens screw may be provided with a washer 49, bushing 50, and nut 51, as shown in Figure 6. The washer 49 and bushing 50 are preferably constructed substantially as disclosed in McDonell United States Patent 2,332,160. It will be understood, however, that any other suitable means of securing the lenses 38 to the ears 42 could be employed. It will likewise be understood that the mounting as sold by the manufacturer does not usually include any lenses, but does include all of the other parts above described, and that the lenses are affixed by the optician.

The lens straps 40 may advantageously be made of somewhat resilient material and, after the forming operation, the ears 42 may be left slightly spaced apart. By so doing, when the lens screw and strap assembly is tightened to the position shown in Figure 6, the ears 42 act as spring lock washers to prevent loosening of the nut 51. At the same time, the loop 46 is left sufficiently loose on the head of the staple so that it may readily pivot thereon.

By virtue of the pivoted connection between the strap 40 and the head of the staple 41, the lenses are suspended from the spectacle front in a freely floating manner. Any strain or distortion in the mounting, therefore, is not transmitted to the lenses. This is shown clearly in Figure 3, in which the spectacles 30 are shown in a severely distorted position which they would assume when the temples are spread outward a considerable distance. It will be observed in Figure 3 that the lenses 38 simply ride forward of the spectacle front and that, therefore, the lenses are free from the strain induced in the spectacle front by the distortion.

In the modification shown in Figures 7 to 14, inclusive, the same general principles of construction are followed, but the staples project rearward, instead of forward, from the spectacle front, and the lenses are suspended directly under the spectacle front. The spectacles 70 of these figures comprise a spectacle front 71, hinges 72 and temples 73. As before the spectacle front has a bridge portion 74, top arm portions 75, nose pads 76, and endpiece portions 77, all preferably integrally formed of plastic material such as zylonite.

The lenses 78 of the spectacles 70 are suspended from the spectacle front 71 at two spaced points by a pair of pivoting lens strap assemblies 79, one of each pair of these assemblies 79 being secured to the bridge portion 74 and the other to an endpiece portion 77 of the front 71. As shown in Figure 9, the strap assemblies 79 are identical to the assemblies 39 of the first modification, differing only in their position. The assemblies 79 have the heads of the staples 41 positioned at the rear of the spectacle front 71, with the legs of the staples extending from the back to the front through the plastic material of the spectacle front. The lenses 78 are thus suspended directly beneath the spectacle front 71, as shown most clearly in Figure 10, but, as before, they are free to move with respect to the spectacle front by virtue of the pivoted connection between the straps 40 and the staples 41, when the spectacle front is distorted.

The endpiece portions 77, for reasons of appearance, are curved rearward, and this requires a special construction of the hinges 72. As shown in Figures 11, 12 and 13, each hinge 72 comprises a hinge member 80 having a curved extension 81, a hinge member 82 having a straight extension 83, and a pintle 84. The extension 81 is secured to the inside of the curved endpiece portion 77 by a staple 85 having a decorative head 86, the ends of the legs of the staple 85 being riveted in holes provided in the extension 81. Similarly, the extension 83 is secured to the inside of the temple 73 by a staple 87 having a decorative head 88.

Figure 14 shows a modified form of strap 90 which may be substituted for the strap 40 of Figures 1 to 6. The strap 90 is formed and shaped similarly to the strap 40, except that it has a washer 91 soldered to the outside of one of its ears 92. The washer 91 is then tapped as shown at 93 to accommodate the lens screw. The nut 51 of Figure 6 then becomes unnecessary. In order to use such a modified strap in the construction of Figures 7 to 10, it would be necessary to solder the washer 91 on the outside of the other ear 92, as will be apparent upon comparing Figure 6 with Figure 9.

Figures 15 to 18 show a modified spectacle construction generally resembling that of Figures 1 to 6, except that the spectacle front is recessed so that the lenses are suspended partly under and partly in front of the top arms of the spectacle front. In Figures 15 to 18, the spectacles 100 comprise a spectacle front 101, hinges 102 and temples 103. The spectacle front, in turn, comprises a bridge portion 104, top arm portions 105, nose pads 106 and endpiece portions 107.

The lenses 108 of the spectacles 100 are suspended in the same manner as before by pivoting lens strap assemblies 109 which are identical to those of Figures 1 to 6 except that the staple legs are somewhat shorter. The staple legs are shortened because they have less material to pass through, by reason of the recessing of the spectacle front as shown at 110 in Figures 17 and 18. The operation of the modification shown in Figures 15 to 18 is the same as already described.

Figures 19 to 22 disclose still another modification, which differs from all of those previously described in that the staples are located in the general medial plane of the spectacle front, rather than transversely thereof as heretofore. In Figures 19 to 22, the spectacles 120 again comprise a spectacle front 121, hinges 122 and temples 123. The spectacle front comprises a bridge portion 124, top arm portions 125, nose pads 126 and endpiece portions 127, all preferably formed, as before, integrally from zylonite or like plastic material. Each of the lenses 128 is pivotally suspended at two spaced points by pivoting lens strap assemblies 129 which may be identical to those previously described, except as respects position.

Figure 19:
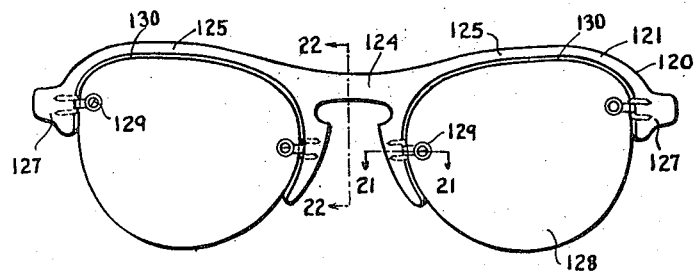
Figure 19 is a front view of a pair of spectacles embodying a further modification of my invention.
Figure 20:
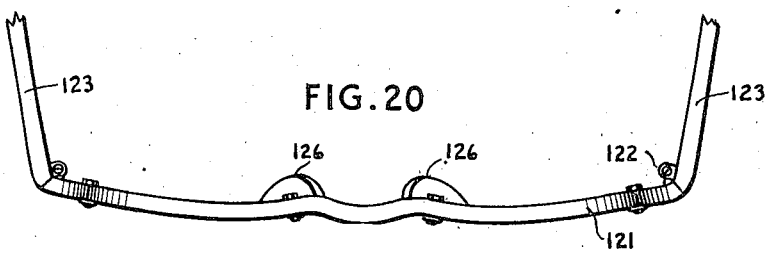
Figure 20 is a top plan view thereof.
Figures 21, 22:
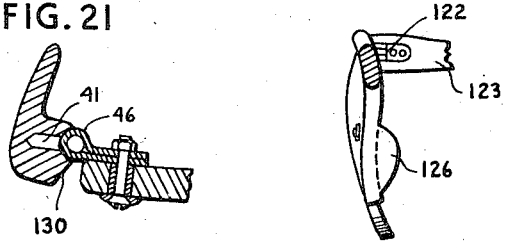
Figure 21 is a detail view taken on the line 21—21 of Figure 19.
Figure 22 is a vertical section taken on the line 22—22 of Figure 19.

As shown most clearly in Figures 19 and 21, the legs of the staples 41 project endwise into the plastic material of the spectacle front, and hence these staples lie in the general medial plane of the spectacle front 121. By proper positioning of these staples, as shown in Figures 21 and 22, the lenses 128 are suspended directly beneath the top arms 125.

In order to provide greater clearance for free movement of the lenses 128 with respect to the spectacle front 121, by pivotal movement of the strap assemblies 129 when the mounting is distorted, I preferably cut away or bevel the portions of the spectacle front immediately adjacent the edges of the lenses, as shown at 130 in Figures 19 and 21. The bevel 130 is illustrated as extending along the entire inner perimeter of the mounting adjacent the lens 128, and this is preferred from the appearance and manufacturing standpoints, but for the purpose of providing the desired clearance, only the portions of the bevel adjacent the endpieces and the bridge are functionally ncessary.

It will be observed that in all of the foregoing modifications, the legs of the staple 41 fit fairly closely on either side of the loop 46 of the strap 40. Vertical displacement of the strap 40 is thereby prevented, but nevertheless, a slight amount of play in a vertical direction is permitted, which is beneficial in relieving the lenses of any strain which might otherwise be occasioned by slight inaccuracy in mounting.

It will also be observed that in each of the foregoing modifications, the staple constitutes a pintle member on which the lens strap is pivoted for rotation about a substantially vertical axis, the round head of the staple being the journal portion of the pintle member, and the legs of the staple serving the double purpose of limiting vertical movement of the lens strap on the journal portion and of securing the pintle member to the plastic body of the ophthalmic mounting.

Although I have thus described my invention in considerable detail in the best forms of which I am aware, in accordance with the patent statutes, it will be evident that various changes and modifications may be made by those skilled in the art without departing from the spirit of my invention. For example, the spectacle front need not be made wholly of plastic material, but may be re-enforced with metal, as already known in this art. Accordingly, I desire to be limited only by the scope of the appended claims.

I claim:

1. A semi-rimless ophthalmic mounting comprising a bridge, top arms and endpieces made at least in part of plastic material, four substantially U-shaped staples having their legs extending into said plastic material, said staples being located at spaced points appropriate for connection to the opposite sides of a pair of lenses to be supported from said staples, the head of each of said staples constituting a substantially vertical journal portion, and a lens strap pivotally mounted on each of said journal portions, said staple legs serving to limit vertical movement of said lens straps on said journal portions.

2. A semi-rimless ophthalmic mounting comprising a bridge, top arms and endpieces made at least in part of plastic material, four substantially U-shaped staples having their legs extending into said plastic material, said staples being located at each side of said bridge and at each endpiece, the head of each of said staples constituting a substantially vertical journal portion, and a lens strap pivotally mounted on each of said journal portions, said lens straps each embodying a loop surrounding said journal portion and said staple legs serving to limit vertical movement of said loops on said journal portions.

3. A semi-rimless ophthalmic mounting comprising a bridge, top arms and endpieces made at least in part of plastic material, four substantially U-shaped staples having their legs extending into said plastic material and lying substantially in the medial plane of said mounting, said staples being located at spaced points appropriate for connection to the opposite sides of a pair of lenses to be supported from said staples, the head of each of said staples constituting a substantially vertical journal portion, and a lens strap pivotally mounted on each of said journal portions, said staple legs serving to limit vertical movement of said lens straps on said journal portions, whereby said lenses are suspended substantially under said top arms and are free to move about said journal portions when said mounting is distorted.

4. A semi-rimless ophthalmic mounting comprising a bridge, top arms and endpieces made at least in part of plastic material, four substantially U-shaped staples having their legs extending into said plastic material and lying substantially in the medial plane of said mounting, said staples being located at each side of said bridge and at each endpiece, the head of each of said staples constituting a substantially vertical journal portion, and a lens strap pivotally mounted on each of said journal portions, said lens straps each embodying a loop surrounding said journal portion and said staple legs serving to limit vertical movement of said loops on said journal portions, whereby lenses may be suspended substantially under said top arms so as to be free to move about said journal portions when said mounting is distorted.

5. A semi-rimless ophthalmic mounting comprising a bridge, top arms and endpieces made at least in part of plastic material, four substantially U-shaped staples having their legs extending into said plastic material and lying substantially in the medial plane of said mounting, said staples being located at each side of said bridge and at each endpiece, the head of each of said staples constituting a substantially vertical journal portion, and a lens strap pivotally mounted on each of said journal portions, said lens straps each embodying a loop surrounding said journal portion and said staple legs serving to limit vertical movement of said loops on said journal portions, whereby lenses may be suspended substantially under said top arms, and the portions of said plastic material adjacent the ends of the lenses being beveled to provide additional clearance for movement of the lenses with respect to the mounting about said journal portions when said mounting is distorted.

6. A semi-rimless ophthalmic mounting comprising a bridge, top arms and endpieces made at least in part of plastic material, four substantially U-shaped staples having their legs extending into and through said plastic material in a direction generally transverse to the medial plane of said mounting, the ends of said legs being peened where they project through said plastic material, said staples being located at spaced points appropriate for connection to the opposite sides of a pair of lenses to be supported from said staples, the head of each of said staples constituting a substantially vertical journal portion, and a lens strap pivotally mounted on each of said journal portions, said staple legs serving to limit vertical movement of said lens straps on said journal portions.

7. A semi-rimless ophthalmic mounting comprising a bridge, top arms and endpieces made at least in part of plastic material, four substantially U-shaped staples having their legs extending into and through said plastic material in a direction generally transverse to the medial plane of said mounting, the ends of said legs being peened where they project through said plastic material, said staples being located at each side of said bridge and at each endpiece, the head of each of said staples constituting a substantially vertical journal portion, and a lens strap pivotally mounted on each of said journal portions, said lens straps each embodying a loop surrounding said journal portion and said staple legs serving to limit vertical movement of said loops on said journal portions.

JOHN J. ROHRBACH.

REFERENCES CITED

The following references are of record in the file of this patent:

UNITED STATES PATENTS

| Number | Name | Date |
|---|---|---|
| 2,301,328 | Rochte | Nov. 10, 1942 |
| 2,355,053 | Carlson | Aug. 8, 1944 |
| 2,357,267 | Rohrbach | Aug. 29, 1944 |
| 2,389,742 | Rey | Nov. 27, 1945 |
| 1,510,001 | Gunning | Sept. 30, 1924 |
| 2,376,468 | Wiseman | May 22, 1945 |

FOREIGN PATENTS

| Number | Country | Date |
|---|---|---|
| 801,204 | France | May 16, 1936 |